Dec. 13, 1949   F. J. WOOD   2,491,405
SHAKER CONVEYER
Filed Sept. 19, 1945   2 Sheets-Sheet 1
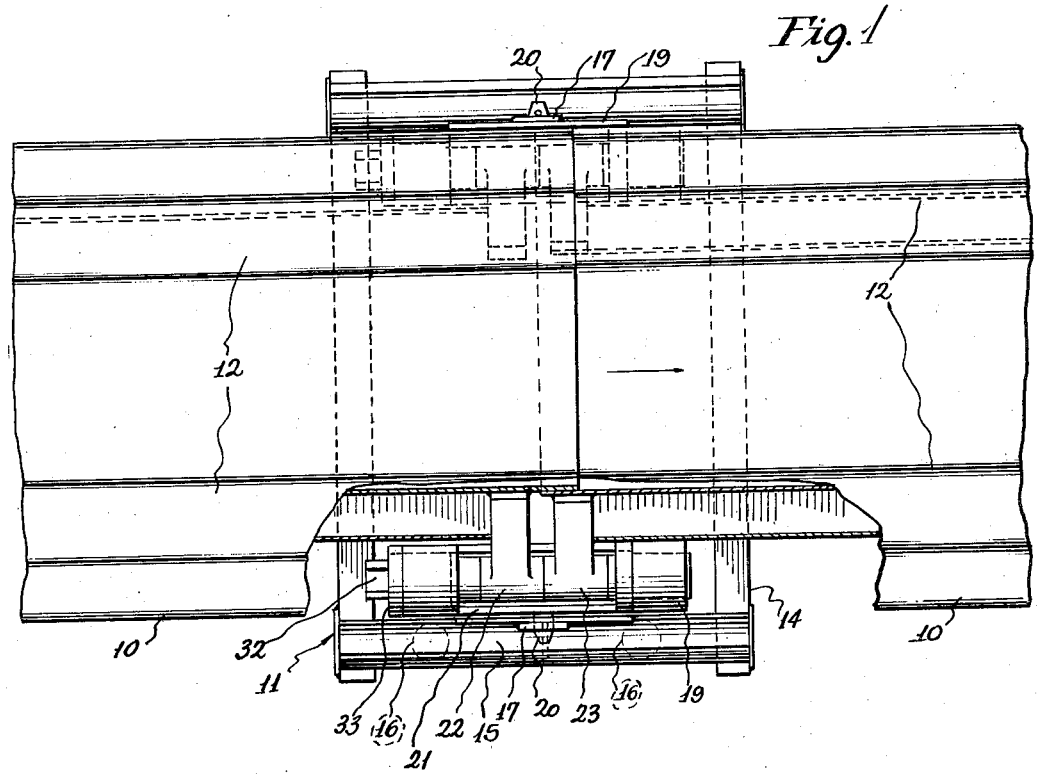
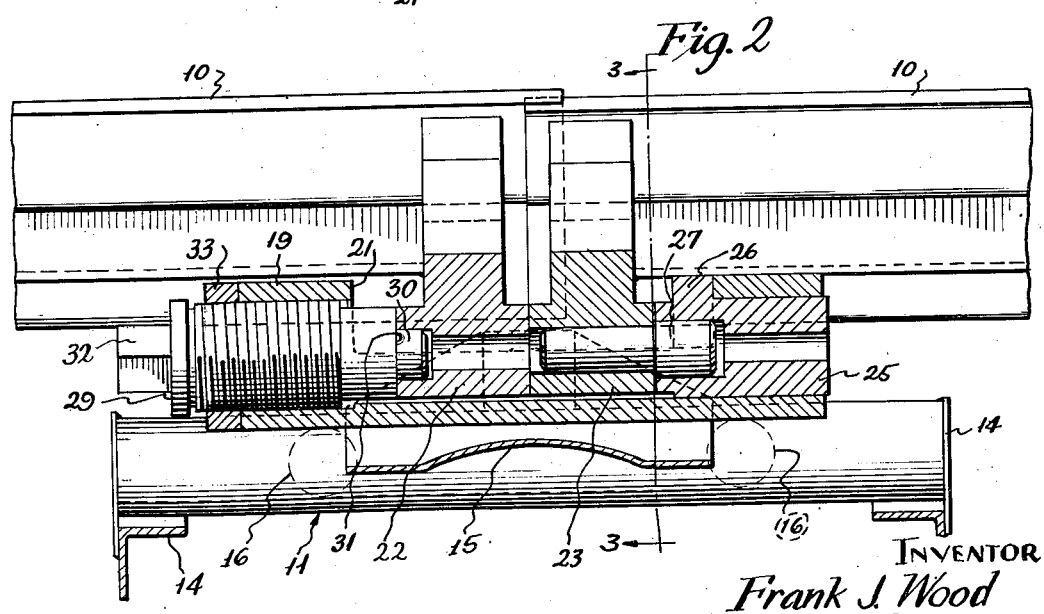
INVENTOR
Frank J. Wood
Clarence F. Poole
ATTORNEY Dec. 13, 1949   F. J. WOOD   2,491,405
SHAKER CONVEYER
Filed Sept. 19, 1945   2 Sheets-Sheet 2
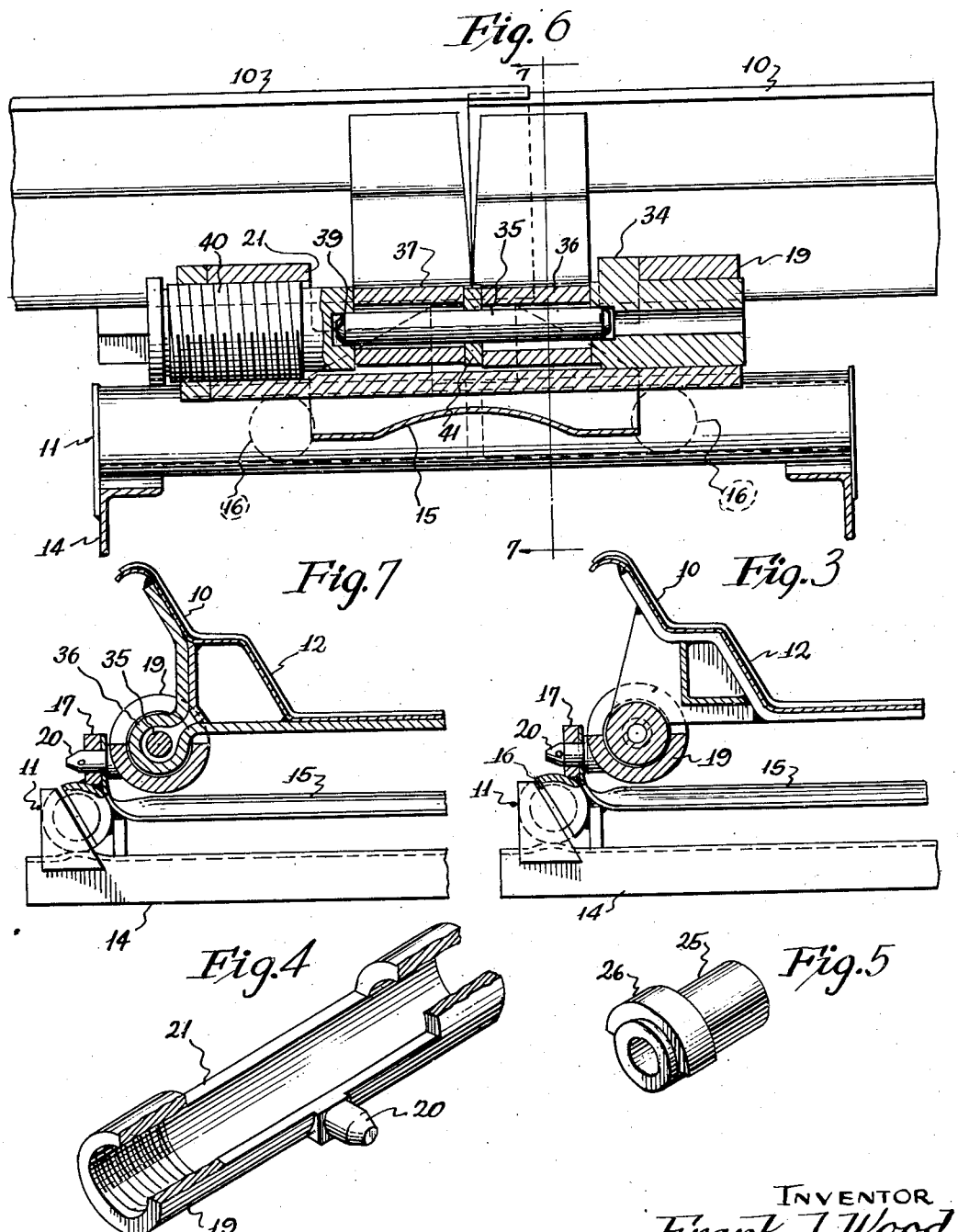

Patented Dec. 13, 1949

2,491,405

UNITED STATES PATENT OFFICE 2,491,405

SHAKER CONVEYER

Frank J. Wood, Riverside, Ill., assignor to Goodman Manufacturing Company, Chicago, Ill., a corporation of Illinois Application September 19, 1945, Serial No. 617,288

10 Claims. (Cl. 198—220)

This invention relates to improvements in shaker conveyers, and has as its principal objects to provide an improved and simplified form of connecting means for connecting the troughs of a shaker conveyer together.

A more specific object of my invention is to provide a rugged, novel, and simplified form of connecting means for the troughs of a shaker conveyer, wherein a saddle transversely pivoted to the reciprocating support for the trough sections is adapted to receive the connecting eyes of the troughs of the conveyer and form the means for connecting the ends of the troughs together.

These and other objects of my invention will appear from time to time as the following specification proceeds and with reference to the accompanying drawings wherein:

Figure 1 is a fragmentary plan view of adjacent ends of two troughs of a shaker conveyer trough line with certain parts of the troughs broken away and certain other parts thereof shown in horizontal section;

Figure 2 is a view in side elevation of the troughs shown in Figure 1, drawn to a larger scale than Figure 1 and showing certain parts of the connecting means for the troughs in substantially longitudinal section;

Figure 3 is a fragmentary transverse sectional view taken substantially along line 3—3 of Figure 2;

Figure 4 is an enlarged detail isometric view of one of the supporting saddles of the connecting means of my invention;

Figure 5 is a detail isometric view of one of the stops which form a part of the connecting means of my invention;

Figure 6 is a fragmentary view in side elevation of adjacent ends of two troughs of a shaker conveyer, showing a modified form of connecting means constructed in accordance with my invention in substantially longitudinal section; and Figure 7 is a transverse sectional view taken substantially along line 7—7 of Figure 6.

In the embodiment of my invention illustrated in the drawings, two shaker conveyer troughs 10, 10 are shown as being mounted on a ball frame 11 and connected together in overlapping relation with respect to each other. Said troughs are each of a usual construction having a flat bottom and outwardly inclined flared sides 12, 12, and while herein shown as being connected in overlapping relation, may also be connected in abutting relation in cases where it is desired that the conveyer be reversible.

The ball frame 11 may be of any well known construction and is herein shown as including a lower frame member 14 suitably held in fixed relation with respect to the ground during operation of the conveyer and having an upper frame member 15 mounted on and guided for reciprocable movement therealong on balls 16, 16.

The upper frame member 15 of the ball frame 11 is provided with a pair of longitudinally extending upright ears 17, 17 at opposite sides thereof (see Figures 1 and 3). Each of said ears is adapted to form a pivotal support for a saddle 19, which is mounted thereon for pivotal movement about an axis extending transversely of the conveyer on a laterally extending integrally formed pin 20. Said pin may be drilled adjacent its end to receive a cotter key (not shown), for retaining said saddle to said ear.

The saddle 19 is herein shown as being of a substantially cylindrical form having a cut-out central portion 21 adapted to receive two abutting connecting eyes 22 and 23 of adjacent ends of the respective trough sections 10, 10. A cylindrical stop 25 fits within one cylindrical end portion of the saddle 19 and is adapted to be abutted by an end of the connecting eye 23. The fit between said stop and end portion is relatively tight, to retain said stop within said end portion. Said stop has a segmental flange 26 spaced from its inner end and extending partially therearound, which is adapted to abut the inner edge of one cylindrical end portion of said saddle, to limit movement of said stop with respect to said saddle. A pin 27 mounted within the eye 23, preferably with a pressed fit, to retain said pin within said eye, is adapted to extend within said stop, to align said eye with said saddle and to hold said eye in alignment therewith. The end of said pin which is adapted to engage said stop is beveled to permit it to be readily inserted within said stop.

The opposite cylindrical end portion of the saddle 19 is internally threaded and has a screw 29 threaded therein. Said screw has a reduced end 30 adapted to fit within the connecting eye 22 of the adjacent conveyer trough 10. Said reduced end is beveled at its entering end and has a shouldered portion 31, which is adapted to abut the outer end of said eye 22, to hold said connecting eye in engagement with the adjacent connecting eye 23, and to connect the two trough sections together. Said screw likewise has a head 32 arranged to permit a wrench (not shown) to be used to tighten said screw to engage its end within said eye 22, to align said eye with the eye 23 and to engage the shouldered portion of said screw against the outer end of said eye 22. A lock nut 33 threaded on said screw is provided to lock said screw from turning during operation of the conveyer.

In connecting the trough sections of the conveyer together the connecting eyes 23, 23 are first lowered in the saddles 19, 19 and the pins 27, 27 are engaged within the apertured portions of the stops 25, 25. The adjacent connecting eyes 22, 22 are then lowered in the saddles 19, 19 in abutting relation with respect to said first mentioned connecting eyes. The screws 29, 29 are then turned until the reduced beveled ends 30 of said pins fit within the open portions of the eyes 22, 22. Said screws are then tightened to align the eyes 22, 22 with the eyes 23, 23 and to positively lock the eyes 22, 22 in the saddles 19, 19, and thus form a positive connecting means having no loose parts, for connecting adjacent ends of the troughs 10, 10 together.

In the modified form of my invention illustrated in Figures 6 and 7, the same saddles are used as in the form of my invention illustrated in Figure 1, but the connecting means is adapted to be applied to the standard connecting eyes in use on shaker conveyer trough sections rather than the heavier reinforced eyes shown in Figures 1 and 2. In the form of my invention illustrated in Figure 6, a stop 34 is provided. Said stop is similar to the stop 25 and is adapted to receive the end of a pin 35. Said pin is adapted to loosely extend through connecting eyes 36, 37 of adjacent ends of the trough sections 10, to align said eyes. The opposite end of said pin is adapted to fit within a recessed end portion 39 of a screw 40, the inner end of which screw is adapted to engage the outer end of the connecting eye 37, to positively hold said connecting eyes within said saddles.

The pin 35 is herein shown as having a collar 41 pressed thereon so as to remain in place on said pin during connecting and disconnecting of the trough sections of the conveyor. Said collar is adapted to be abutted by adjacent ends of the connecting eyes 36, 37 and form flat abutting surfaces engaged with said eyes. This permits ready alignment of the two troughs without necessitating the finishing of the adjacent end surfaces of said eyes. It also reduces peening over of adjacent ends of said connecting eyes caused by irregular engaging surfaces thereof and pounding between said eyes in cases where the connection between said troughs might be loose, during operation of the conveyor.

In connecting the troughs of the conveyor together the pin 35 is first inserted within the connecting eyes 36, 37, with the collar 41 abutting the adjacent ends of said eyes. The troughs are then lowered within the saddles 19, 19 and one end of the pin is inserted within the stop 34. The screw 40 is then turned to engage the recessed portion 39 with the end of the pin 35, and to engage the inner end of said screw with the outer end of the adjacent connecting eye 36 and firmly clamp said connecting eyes within the saddle 19.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. A connecting means for adjacent ends of the troughs of a shaker conveyor comprising a reciprocating support for said troughs, a saddle transversely pivoted to said reciprocating support, an eye extending laterally from each of said troughs, said eyes on adjacent ends of said troughs being adapted to extend within and be supported by said saddle in abutting relation with respect to each other, and means for aligning said eyes within said saddle including, a clamping member mounted in one end of said saddle and adapted to engage an end face of one of said eyes to clamp said eyes within said saddle and hold said troughs in connected relation with respect to each other.

2. A connecting means for adjacent ends of the troughs of a shaker conveyer comprising a reciprocating support for said troughs, a saddle transversely pivoted to said reciprocating support, an eye extending laterally from each of said trough, said eyes on adjacent ends of said troughs being adapted to extend within and be supported by said saddle in abutting relation with respect to each other, and means for aligning said eyes within said saddle including, a clamping member threaded within one end of said saddle and adapted to engage an end face of an adjacent eye and to clamp said eyes within said saddle.

3. A connecting means for adjacent ends of the troughs of a shaker conveyer comprising a reciprocating support for said troughs, a saddle transversely pivoted to said reciprocating support, an eye extending laterally from each of said troughs and adapted to extend within and be supported by said saddle, and means in opposite ends of said saddle adapted to have interengaging connection with said eyes and saddle, for holding said troughs in connected relation with respect to each other including a clamping member threaded within one end of said saddle and adapted to clamp said eyes within said saddle.

4. A connecting means for adjacent ends of the troughs of a shaker conveyer including a reciprocating support for adjacent ends of said troughs, a saddle transversely pivoted to each side of said reciprocating support and extending longitudinally of said troughs, eyes extending laterally from opposite sides of adjacent ends of said troughs and opening in directions extending longitudinally of the conveyer, said eyes being adapted to be supported in said saddles in abutting relation with respect to each other, interengaging connections between said eyes on each side of one trough and their associated saddles, and clamping members mounted within said saddles and adapted to engage the end faces of adjacent of said eyes extending laterally from the adjacent end of the next adjacent trough and to have interengaging connection therewith, to clamp said eyes together within said saddles and to hold said troughs in connected relation with respect to each other.

5. A connecting means for adjacent ends of the troughs of a shaker conveyer including a reciprocating support for adjacent ends of said troughs, a saddle transversely pivoted to each side of said reciprocating support and extending longitudinally of said troughs, eyes extending laterally from adjacent ends of said troughs and opening in directions extending longitudinally of the conveyer, projecting means mounted in said eyes of one of said troughs and adapted to have interengaging connection with one of the ends of said saddles, for aligning said eyes extending laterally from said one trough with their associated saddles, and clamping means mounted within the opposite ends of said saddles and adapted to extend within said eyes extending laterally from the adjacent end of the next adjacent trough, to hold said troughs in connected relation with respect to each other.

6. A connecting means for adjacent ends of the troughs of a shaker conveyer including a reciprocating support for adjacent ends of said troughs, a saddle transversely pivoted to each side of said reciprocating support, and extending longitudinally of said troughs, eyes extending laterally from adjacent ends of said troughs and opening in directions extending longitudinally of the conveyer, said eyes being adapted to be supported in said saddles in abutting relation with respect to each other, interengaging connections between said eyes on each side of one trough and their associated saddles, and clamping members threaded within one of the ends of said saddles and adapted to engage the end faces of and extend within the adjacent eyes extending laterally from the adjacent end of the next adjacent trough to clamp said eyes together within said saddles.

7. A connecting means for adjacent ends of the troughs of a shaker conveyer including a reciprocating support for adjacent ends of said troughs, a saddle transversely pivoted to each side of said reciprocating support, and extending longitudinally of said troughs, eyes extending laterally from adjacent ends of said troughs and opening in directions extending longitudinally of the conveyer, and means adapted to have interengaging connection with said saddles and adjacent ends of said eyes, for holding said troughs in connected relation with respect to each other, said means including a clamping member threaded within one of the ends of each of said saddles and adapted to engage the end of an adjacent connecting eye.

8. A connecting means for the troughs of a shaker conveyor trough line including a reciprocating support for adjacent ends of said troughs, a saddle mounted on said reciprocating support, and extending longitudinally of said troughs, an eye extending laterally from each of said troughs, said eyes on adjacent ends of said troughs being adapted to extend within and be supported by said saddle in abutting relation with respect to each other, an engaging connection between one of said eyes and one end of said saddle, and a clamping member mounted in the opposite end of said saddle and adapted to engage an end face of the other of said eyes to clamp said eyes together within said saddle and hold said troughs in connected relation with respect to each other.

9. A connecting means for the troughs of a shaker conveyor trough line including a reciprocating support for adjacent ends of said troughs, a saddle mounted on each side of said reciprocating support and extending longitudinally of said troughs, eyes extending laterally from opposite sides of adjacent ends of said troughs and adapted to extend within and be supported by said saddles in abutting relation with respect to each other, an interengaging connection between said eyes extending laterally from one trough and said saddles and clamping members in said saddles and adapted to engage adjacent faces of said eyes extending laterally from said next adjacent trough to clamp said eyes together within said saddles and hold said troughs in connected relation with respect to each other.

10. A connecting means for the troughs of a shaker conveyor trough line including a reciprocating support for adjacent ends of said troughs, a saddle mounted on each side of said reciprocating support and extending longitudinally of said troughs, eyes extending laterally from adjacent ends of said troughs and adapted to extend within and be supported by said saddle in abutting relation with respect to each other, means having interengaging connection with said saddle for aligning said eyes with respect to each other and with said saddle, and a clamping member in one end of said saddle and adapted to engage an end face of one of said eyes and to have interengaging connection with said aligning means to clamp said eyes within said saddle and to hold said troughs in connected relation with respect to each other.

FRANK J. WOOD.

REFERENCES CITED

The following references are of record in the file of this patent:

UNITED STATES PATENTS

| Number | Name | Date |
| --- | --- | --- |
| 983,586 | Wagner | Feb. 7, 1911 |
| 2,066,451 | Bebinger | Jan. 5, 1937 |
| 2,215,338 | Sloane | Sept. 17, 1940 |

FOREIGN PATENTS

| Number | Country | Date |
| --- | --- | --- |
| 520,441 | Germany | Mar. 11, 1931 |